A. T. NELSON & C. A. KLAWITER.
AUTOMATIC STEERING DEVICE.
APPLICATION FILED DEC. 21, 1911.

1,122,794.

Patented Dec. 29, 1914.

3 SHEETS—SHEET 2.

A. T. NELSON & C. A. KLAWITER.
AUTOMATIC STEERING DEVICE.
APPLICATION FILED DEC. 21, 1911.
1,122,794.
Patented Dec. 29, 1914.
3 SHEETS—SHEET 3.
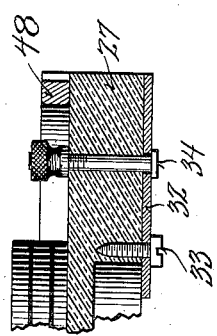
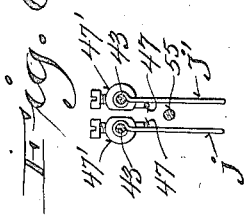
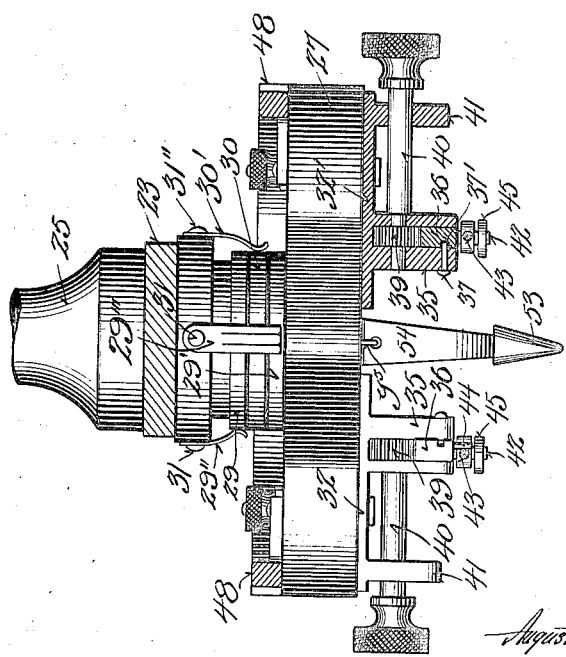

UNITED STATES PATENT OFFICE.

AUGUST T. NELSON AND CHARLES A. KLAWITER, OF MILWAUKEE, WISCONSIN, ASSIGNORS TO AUTOMATIC STEERING CO., OF MILWAUKEE, WISCONSIN.

AUTOMATIC STEERING DEVICE.

1,122,794.  Specification of Letters Patent.  Patented Dec. 29, 1914.

Application filed December 21, 1911. Serial No. 667,094.

*To all whom it may concern:*

Be it known that we, AUGUST T. NELSON and CHARLES A. KLAWITER, both citizens of the United States, and residents of Milwaukee, in the county of Milwaukee and State of Wisconsin, have invented certain new and useful Improvements in Automatic Steering Devices; and we do hereby declare that the following is a full, clear, and exact description thereof.

The object of our invention is to provide a simple, economical and accurate means for automatically steering crafts upon a predetermined course, the construction and arrangement being such that the permanent magnet of a mariner's compass primarily controls the opening or closing of an electric circuit through which circuit mechanism is put into motion whereby the rudder of the vessel is automatically actuated to bring the craft back to its course, should there be a slight deflection therefrom. After the vessel has been returned to her true course the electric mechanism will automatically reverse the rudder to bring the same back to its normal or fore and aft position.

Our present invention particularly refers to that class of automatic steering devices such as shown and described in a patent to August T. Nelson, dated January 16, 1912, No. 1,015,061.

Specific objects of our present invention are to provide means in gear connection with a non-reversible motor and a tiller mechanism whereby the position of the tiller is controlled, the control being effected by electric connections from the compass to electrically controlled reverse clutches; to provide means for automatically adjusting a pair of contact points that operate in conjunction with a contact finger carried by the compass, said circuit make and break mechanism being adapted to direct electric current into one or the other of a pair of magnetically actuated clutches; to provide simple switch mechanism in circuit with a main line whereby current from the main circuit is directed into one or the other of the pair of magnetically controlled clutches without effecting disarrangement of the compass.

With the above objects in view the invention consists in certain peculiarities of construction and combination of parts as hereinafter set forth with reference to the accompanying drawings and subsequently claimed.

Figure 1:
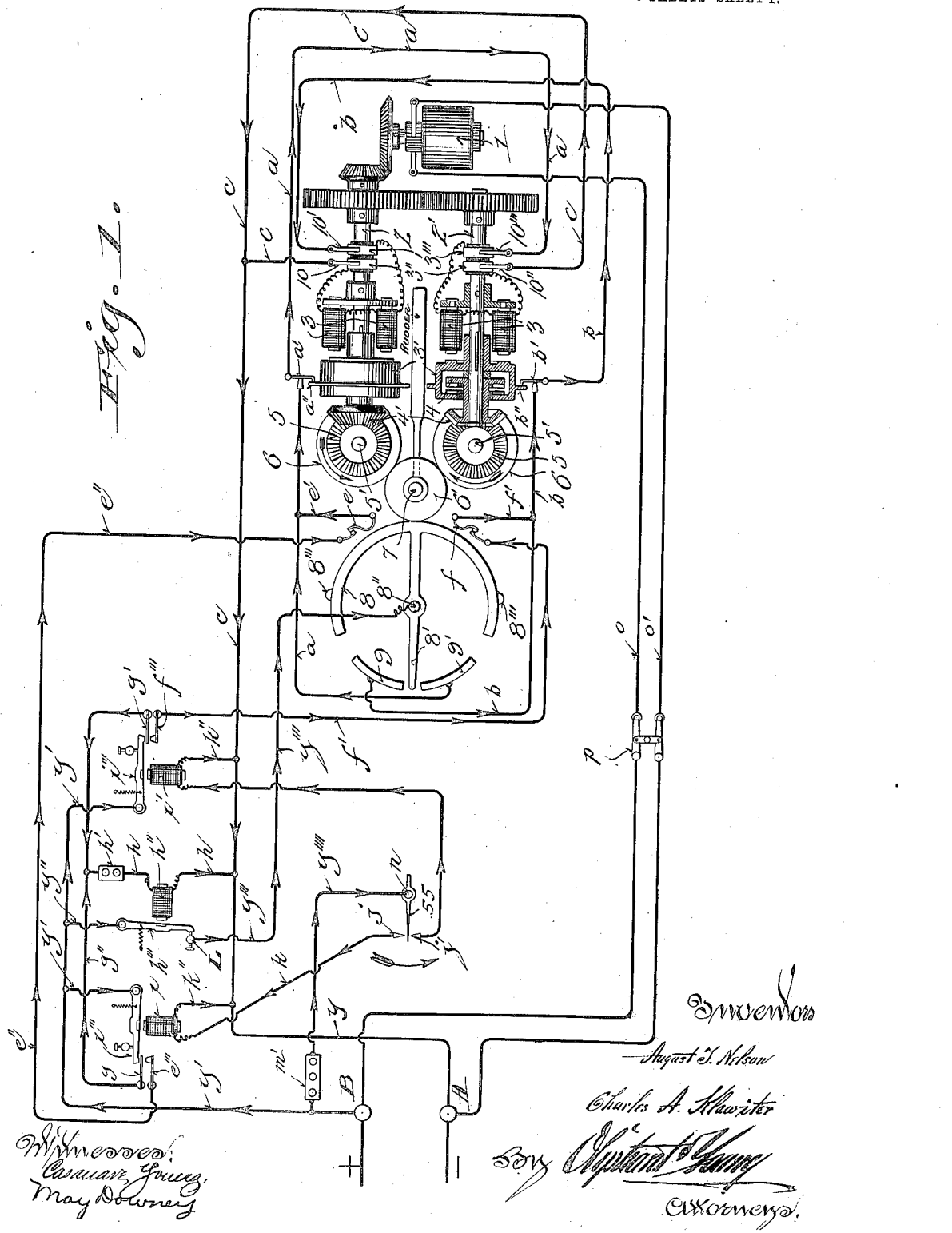
Figure 2:
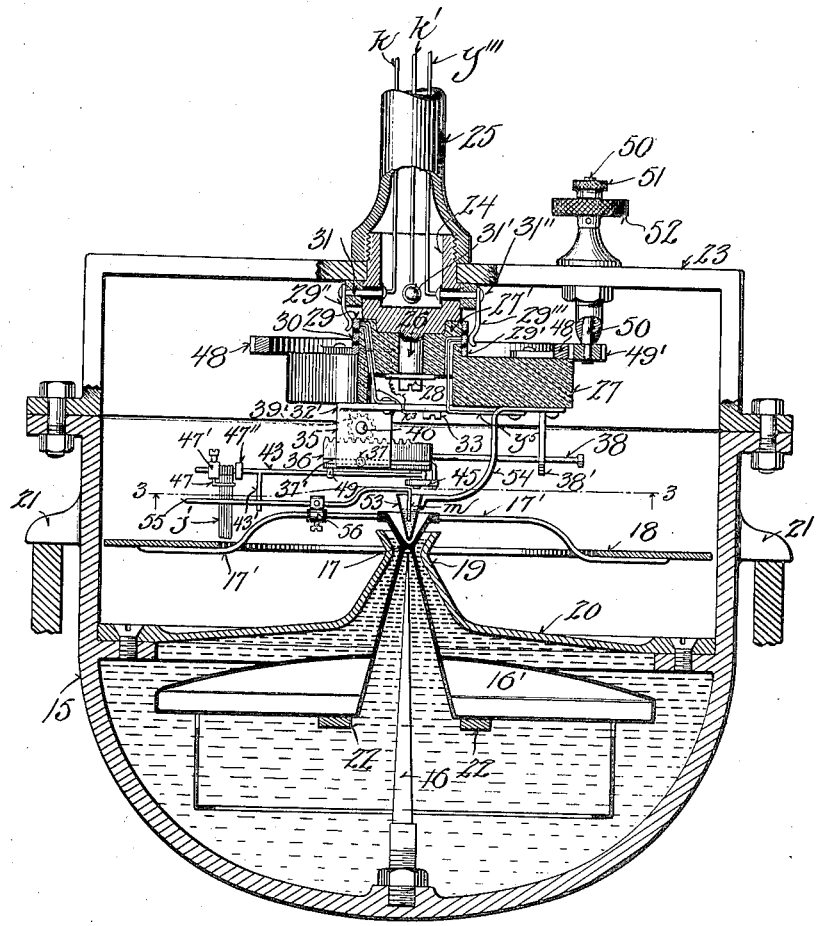
Figure 3:
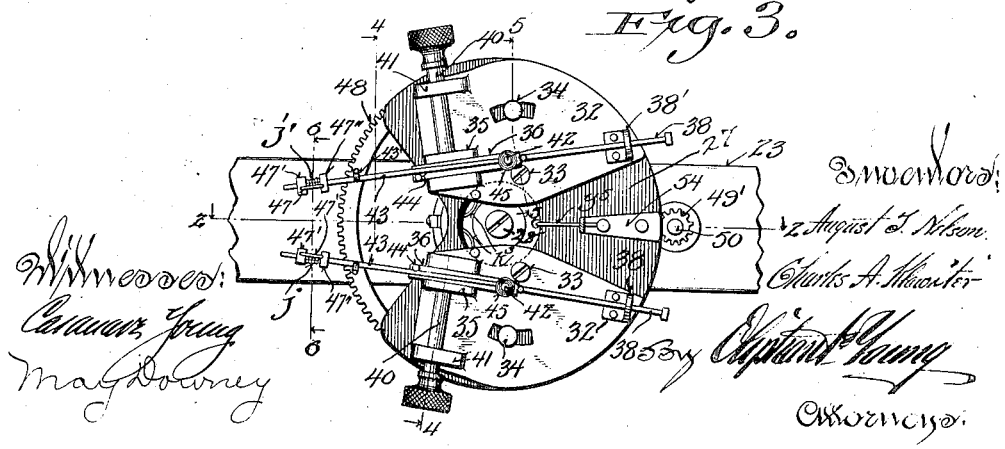

In the drawings Figure 1 represents a view in diagram of the electrical circuits in connection with a complete apparatus embodying the features of our invention; Fig. 2, a longitudinal sectional view of the compass equipped with contact mechanism embodying the features of our invention, the section being indicated by line 2—2 of Fig. 3; Fig. 3, a detailed inverted plan view of the adjustable contact mechanism; Fig. 4 represents a detailed elevation of the contact point adjusting mechanism partly in section as indicated by line 4—4 of Fig. 3; Fig. 5, a detailed cross-section of a portion of the same, the section being indicated by line 5—5 of Fig. 3; Fig. 6, a detailed cross-section showing the relation of the contact points or brushes and compass-carried finger, and Fig. 7, an enlarged plan view of a tension spring for holding the contact points in their proper relation to each other.

Referring by characters to the diagram view Fig. 1 of the drawings, 1 represents a motor which is in gear connection with a clutch arbor 2, which clutch arbor is geared to a second clutch arbor 2', the pair being rotated in opposite directions. The mechanism carried by each of these clutch arbors is similar in construction, which construction will be described in connection with one of said arbors and is as follows: Mounted upon the arbor is a pair of magnets 3 that control a disk clutch member 3' that is splined upon the arbor and adapted to engage a clutch disk 4 that is carried by a beveled pinion 4', the same being loosely mounted upon said arbor. The beveled gear-wheel meshes with a similar beveled gear-wheel 5 on a shaft 5', which shaft carries a gear-wheel 6 that meshes with a smaller gear-wheel 6' that is secured to a controlling shaft 7 for the rudder. The opposite arbor 2' as previously stated is similarly equipped and connected to the rudder-controlling shaft. The rudder-controlling shaft 7 is also in gear connection with a sector 8 that carries a brush pointer 8' which is normally positioned between contact plates 9, 9', the pointer of said mechanism constituting an indicator arm or tell-tale in conjunction with the contact-plate. By the above described mechanism it will apparent that the motor driven in one direction, constantly imparts rotation to the arbors 2 and 2' in opposite directions, which motion is only imparted to the rudder-controlling shaft through the gear-wheels incidental to clutching engagement of one or the other of the beveled gear-wheels 4', with their respective arbors, through the magnets 3. The magnets 3 of each arbor are wired to rings 3'', 3''', that are mounted upon the arbors and insulated therefrom. The rings of the arbor 2 are engaged by contact springs 10, 10', and the rings of the arbor 2' are similarly engaged by contact springs 10'', 10'''. The contact spring 10''' is connected by a wire $a$, to the contact plate 9', the opposite contact plate 9 being connected by a wire $b$ to contact spring 10' that engages ring 3' of the arbor 2, contact spring 10 of this set of springs being connected by a wire $c$ to the contact spring 10'' of the opposite arbor, the wire $c$ being connected to a binding post A that forms a terminal of a main feed line as shown. The conductor wire $a$ is interrupted by a circuit-breaker $a'$ which is normally closed and adapted to be engaged and opened by a projection $a''$, carried by the disk 3', the break occurring when said disk is operated through the energization of the magnets 3, a similar circuit-breaker $b'$ being interposed in the conductor wire $b$ whereby the completed circuit of said conductor is broken, incidental to energization of the magnets 3 that are carried by arbor 2', the break being effected by a projection $b''$ that extends from the disk 3' of the latter clutch mechanism.

The brush pointer 8' constitutes a tell-tale whereby the position of the rudder is indicated, said brush point being adapted to form contact with either one of the contact plates 9, 9', incidental to deflection of the rudder from its normal fore and aft position, which rudder as shown in the diagram for clearness of illustration is extended directly from the rudder-controlling shaft 7. It should be understood however that the rudder-shaft 7, in practice, is usually connected to valve mechanism of a steam steering gear whereby the movements of the rudder are controlled.

The conductor wire $a$ is also connected to a circuit-breaker $e$ through a sectional conductor wire $e'$, $e''$, which conductor wire passes from the circuit-breaker $e$ to a contact spring $e'''$. The wire $b$ corresponding to conductor wire $a$ is similarly connected to a circuit-breaker $f$ by a sectional wire $f'$, $f''$, the terminal of which latter wire is secured to a contact spring $f'''$. The contact springs $e'''$ and $f'''$ are arranged to be engaged by springs $g$, $g'$, which are connected by a conductor wire $g''$. The wire $g'''$ is tapped by a wire $h$ having interposed therein a resistance $h'$ and a secondary magnet $h''$, the opposite end of the wire $h$ being connected to the return conductor wire $c$. Primary relay magnets $l$, $l'$, are connected to contact points $j$, $j'$, respectively, by conductor wires $k$, $k'$, which wires have terminals $k''$, $k'''$, that are also connected to the return wire $c$. The primary magnet $i'$ controls a spring opposed armature $i'''$, which armature is drawn down incidental to energization of the magnet and is adapted to close a circuit through contact springs $g'$ and $f'''$. The primary magnet $i$ controls a similar armature $i''$ that upon energization of its magnet serves to close contact between springs $g$ and $e'''$. Both the armature $i'''$ and $i''$ are connected by a conductor wire $y'$ to a binding post B that forms the other terminal of the main line. The feed conductor wire $y'$ is also connected by a wire $y''$ to an armature $h'''$ that is controlled by the secondary magnet $h''$, said armature being normally held against a contact-post L by a suitable coiled spring as shown. The contact post L is connected by a conductor wire $y'''$ to a center post 8'' upon which the sector 8 and brush point revolve. A contact finger $m$ is, as shown in the diagram, oscillatorily mounted upon a pin $n$, the finger being adapted to make and break connections between the contact points $j$, $j'$, which finger, in practice, is connected to the compass, its position being controlled by the permanent magnet thereof. The finger $m$ is connected by a feed wire $y'''$ to the feed wire $y'$ of the main line, there being interposed therein a resistance $m'$.

As shown in the diagram, motion is imparted to the arbors 2 and 2' by an electric motor 1, brushes of which motor are connected to the main feed line binding posts A and B by conductor wires $o$, $o'$, there being a double switch $p$ interposed in said wires, whereby the motor current may be manually controlled.

In the operation of the apparatus as shown in the diagram, the position of the contact finger $m$ and tell-tale brush pointer 8', together with the rudder indicate that the vessel is traveling upon its true course. Should the vessel swerve in the direction indicated by the arrow the compass finger $m'$ would remain stationary and the contact finger $j$ will engage the same thus bridging the connection at this point. Current will then pass from the line through conductor wire $y''''$ to the relay magnet $i$ through conductor wire $k$, the circuit being completed through wire $k''$ back to the line through wire $y$. Energization of the relay magnet $i$ will cause its armature to close contact between springs $g$ and $e'''$ the said springs being in circuit with the tell-tale. Current will thus pass from the line over wire $y'$ through armature $i'''$ to conductor wire $e'$, $e''$, to circuit breaker $e$ and to conductor wire $a$. From thence the current will pass through the circuit breaker $a'$ to the contact spring $10'''$ and from its ring to the magnets 3, back through the opposite ring and contact spring $10'$. From this spring the circuit will be completed through wire $c$ and the return wire $y$. Coincident with the closing of the above mentioned circuit, current from wire $y'$ will also pass through contact spring $g$ and from thence through wires $g''$ and $h$ to the return wire $y$ whereby the secondary coil $h''$ is energized, causing armature $h'$ to effect a break in its connection between post L whereby current is cut off from the tell-tale through wire $y'''$.

Energization of the magnets 3 through closing of the circuit just described in connection with closure of the circuit between contact finger $j$ and finger $m$ will cause the beveled gear-wheel $4'$ to be coupled to the arbor $2'$, whereby motion therefrom is transmitted to the rudder-shaft 7 in the direction indicated by the arrows. This motion in turn is transmitted to the tell-tale pointer $8'$ through engagement with the segment 8 whereby said tell-tale pointer will engage contact plate 9. This operation will cause the tiller to be deflected whereby the boat will swerve back again upon its course and as soon as the contact point $j$ disengages from finger $m$ the circuit will be broken therethrough resulting in the circuit being also broken in the primary magnet $i$, whereby its armature will return to normal position under spring control. This breaking of the circuit also affects the secondary magnet whereby armature $3'$ will again contact with post L whereby a circuit is completed through conductor wire $y'$, $y''$ and $y'''$ to the tell-tale post $8''$. From thence current will pass through the pointer $8'$ to plate 9 with which said pointer is engaged, the current from the plate being directed through wire $b$ to contact spring $10'$ that engages ring $3'''$ of the arbor 2. Thus the current from said ring will pass through the magnets 3 that are carried by the arbor 2, which magnets are energized, the current passing out through ring $3''$ to the return wire $c$. Energization of this set of magnets will cause clutching engagement, whereby motion will now be imparted to the controller shaft 7 in the reverse direction from that just described causing the tell-tale pointer $8'$ to return to its normal position between the opposite edges of the contact plates 9, $9'$, whereby the circuit through conductor wire $y'''$ is broken and thus the entire apparatus will come to rest.

Attention is called to the fact that circuit-breakers $a'$ and $b'$ are arranged to be controlled by the clutch disk members and will thus render it impossible for one clutch member to be thrown into gear before the opposite clutch is disconnected, this mechanical control of the circuits being desirable to prevent any possibility of the clutching movements overlapping each other.

A further precautionary circuit breaker is applied in connection with the segment 8 of the tell-tale, which segment is provided with lugs $8'''$ that are adapted to operate in conjunction with circuit-breakers $e$ and $f$ to open their respective circuits should the tell-tale pointer swing from its abnormal position in either direction.

Should the opposite contact point $j'$ be brought into engagement with the finger $m$ carried by the compass-card, it is apparent that current will be directed through the opposite primary magnet $i'$ and the magnetically controlled clutch in circuit with said magnet will operate in a similar manner to that described in connection with the magnet carried by arbor $2'$.

From the foregoing description it will be observed that the make and break mechanism carried by the compass will thus automatically throw into gear one or the other of the magnetically controlled clutches which will each rotate the controller shaft in a different direction, it being understood that the motor is continuously driven in the same direction whereby reversal of the motor circuit is avoided, there being a primary relay for each magnetically controlled clutch and a secondary relay that is operated through either of the primary relays whereby an electric circuit through the tell-tale mechanism is controlled to reverse rotation of the controller shaft in order to return the tiller to its normal fore and aft position.

Referring especially to Fig. 2 of the drawings which shows the compass and its connections, 15 indicates the compass-bowl which is provided with a centrally disposed pivot-post 16, upon which post is mounted a hollow float $16'$ the fulcrum point being at the intersection of a double-coned hub 17, the upper terminal of which serves as a connection for the spokes $17'$ of a compass-card 18, the said spokes being radially extended just above a bell-shaped mouth of a second double-cone hub 19 which forms part of a cap-closure 20 that is secured to the inner walls of the bowl and in connection therewith serves as a chamber for the reception of a fluid such as alcohol or the like, into which fluid the float is suspended, the said float being of sufficient specific gravity as to rest lightly upon its supporting post 16.

It will be observed that the compass-card is suspended upon a plane as near as possible coinciding with the plane upon which the pivot-point of the float is located, the gimbals 21 of the bowl being also upon the same line, whereby, owing to the points of oscillation being practically upon the same plane there is slight oscillatory movement imparted to the mechanism, the compass-card and its float being further retarded against vibration due to the fact that the said float is provided with an annular apron to present greater surface area to the liquid. The usual compass-magnet 22 is mounted upon the bottom of the float as shown and, owing to the fact that the card above is rigidly connected to said float, the correct position relative to polarity is maintained.

The bowl has secured thereto a bridge 23 that is centrally apertured for the reception of a hollow head 24, which head is held in place by a hollow stem 25 that is in threaded engagement with the end of the head. The lower end of the head has projecting therefrom a stud 26 upon which is mounted the hub 27' of a revoluble block 27, the same being held in position upon the stud by a suitable washer and cap screw 28 which engages the end of said stud. The block 27 is preferably formed from suitable insulating material and is provided with a circular hub 27' upon which is rigidly secured three metallic rings 29, 29' and 30 respectively. Rings 29 and 29' are engaged by contact springs 29'', 29''', while ring 30 is engaged by a contact spring 30'. These springs 29'' and 29''' are insulated from the head 24 by a ring and secured to said ring and head by studs 31, 31', and the spring 30' is similarly connected to said head by a stud 31'', all of which studs have heads that project within the hollow head as shown. Secured to the heads of studs 31 and 31' and extending upwardly through the stem 25 are conductor wires $k$, $k'$, which conductor wires, as previously explained in connection with the diagram view, are connected to the primary relay coils $i$ and $i'$. The head of the stud 31'' has connected thereto a similar wire $y''''$ which leads to the main feed wire $y'$ as shown by the diagram, it being understood, however, that said conductor wire may tap the main line or source of supply directly, with the same result.

Pivotally secured to the bottom face of the block 27 is a pair of metallic plates 32, 32', the same being journaled upon pins 33. Each plate is held in position with relation to its pivot point by a stud 34, which extends through a segmental aperture in the plate and is provided with a head for engaging the latter. The upper ends of the studs project through the block and are held by caps in screw threaded engagement therewith. Each plate is provided with a depending slotted ear 35 for the reception of a rack-bar 36, the same being confined within the ear by a pin 37 that projects into a groove 37' which is formed in one face of the rack-bar. The rear end of each rack-bar, has projecting therefrom a guide-rod 38 which has sliding engagement with a second ear 38' that depends from the plate. The rack-bars are adapted to be slidably adjusted within their retaining ears by pinions 39 which are in meshed engagement with the teeth of said rack-bars, each pinion being mounted upon a revoluble stud 40, which stud is journaled within an aperture formed in the rack-bar ear and a corresponding aperture in a lug 41 that projects from the face of the plate, these gear-carrying studs being provided with knurled heads whereby they may be manipulated. Projecting from each rack-bar is a pin 42 upon which pin is mounted the hub of an arm 43 that is normally held against a stop-pin 44 that projects from the outer end of the rack-bar by a spring 45 which is helically coiled about the pin 42, its inner coil being connected to the arm hub, while its outer coil is anchored to the rack-bar by a pin as clearly shown in Fig. 7.

Loosely mounted upon the free ends of the arm 43 are a series of fine platinum wire strands constituting the contact points $j$ and $j'$. These strands depend in the form of a cone and are held against movement in an inward direction by guide-bars 47 which extend from collars 47' that are adjustably secured to the ends of the arms 43, the said strands being held against lateral play between said collars and rigid collars 47'' that are also secured to the arms. By this arrangement it will be seen that each of the arms are held by springs 45, securely in their position against the stops 49 carried by the rack-bars and it will also be observed that said arms may be adjusted relative to each other so as to bring the contact points $j$, $j'$, toward each other or spread them apart as conditions may require, this adjustment being effected by loosening the studs 34 and tightening the same thereafter. Furthermore, the arms 43 together with the rackbars upon which they are mounted may be adjusted radially with relation to the block whereby the contact points may be moved in or out.

The upper face of the block is provided with a circular tooth rack 48 into which is meshed a pinion 49' that is carried by a spindle 50, which spindle is journaled in a bearing formed in the bridge, the said spindle being provided with a knurled head that is secured thereto, whereby the same may be rotated and after such rotation the spindle is locked by a cap 51 that is in threaded engagement with the spindle-end, and adapted to impinge against a knurled head 52 whereby the parts are securely tightened in connection with the bridge. This adjustment of the entire head is for the purpose of setting the course of the vessel or craft, it being understood that the compass is fixed relative to a fore and aft line and when it is desired to set said vessel upon a predetermined course the block is rotated until the compass-card and lubber-mark indicate the desired point.

Axially alined with the block is a conical cup 53, which cup is connected to said block by a bracket 54, the cup being adapted to receive a small quantity of mercury and is loosely fitted within the upper conical head of the compass-carrying float hub. Immersed in the mercury within the cup 53 is a contact finger $m$, which finger forms part of a conductor arm 55 that in turn is connected to one of the spokes 17' of the compass-card by a thimble 56 that is secured thereto but insulated therefrom. By this construction it is apparent that a perfect contact is formed between the finger $m$ and cup containing the mercury, the conductor arm 55 as shown in Figs. 2 and 6 being extended outwardly between the wire strands which form the contact points or electrodes $j$ and $j'$. The arms 43 also carry permanent stop-bars 43' that depend therefrom and are offset slightly back of the wire brush strands to form permanent guards or protectors against which the arm 55 will contact, should the wire strands be deflected thereby to such an extent that they would ride over the arm.

The bracket 54 which carries the mercury-pot is connected to ring 30 of the block-hub by a wire strand $y^5$, which wire in effect forms a continuation of the wire $y'''$.

By the arrangement of rings and their spring connections it will be apparent that the block may be adjusted about its axis without breaking the circuits to either the mercury-pot or plates 32, which plates are connected respectively to rings 29, 29' by wire strands $k^3$ as shown.

From the foregoing description it will be readily understood that the mercury-pot will maintain constant electric connection between the finger $m$ irrespective of any oscillatory or rolling movement of the compass-card, whereby friction is eliminated and, as previously described in connection with the diagram, after the course of the vessel is set and the electrodes properly adjusted with relation to the finger arm 55, any deviation from the proper course of the vessel will cause closing of the circuits, whereby the tiller will be automatically deflected to correct the course and thereafter return to its normal position.

We claim:

1. A steering apparatus comprising a compass-card provided with a permanent magnet, a contact finger carried by the compass-card and insulated therefrom, contact points for engagement with the contact finger, a steering gear, an indicator arm in gear connection therewith, contact plates disposed in the path of travel of the indicator arm, a controller shaft for actuating the arm, oppositely rotative loose gears for imparting rotation to the controller shaft, magnetic clutches in connection with the loose gears, a non-reversible motor in gear connection with said loose gears, a pair of relay magnets, a conductor connecting each contact finger of the compass and relay magnet, a return conductor connecting each relay magnet and magnetic clutch mechanism, a conductor connecting the compass finger and a source of electrical energy, armatures for the relay magnets, a conductor connecting said armatures and the source of energy, a pair of contact springs adapted to be closed by each armature, an electric conductor connecting one pair of the contact springs, an electric conductor connecting one of the other contact springs and one of the magnetic clutches and one of the contact plates of the indicator arm, a conductor connecting the other contact plate of the opposite armature and the other magnetic clutch and indicator arm contact plate, a third armature in connection with the feed conductor of the relay armatures, a contact point normally engaging said third armature, a conductor connecting the contact point and indicator arm, and a controlling magnet for said third armature in circuit with the conductor wire that connects the contact springs of the primary armature.

2. A magnetic steering apparatus comprising a liquid containing bowl having a cap closure provided with an open mouth, a pivot-post projecting into the mouth, a float mounted upon the post, a permanent magnet carried by the float, a compass-card carried by said float above the cap closure, a contact finger secured to the compass-card, a bridge in connection with the bowl, a head carried by the bridge, a block pivotally mounted upon the head, the block being provided with a hub portion, conductor rings secured to the hub, a spring contact brush carried by the head for each ring, conductor wires connecting the contact brushes, means for rotating the block, ears carried by said block, longitudinal bars mounted in the ears, means for adjusting the bars longitudinally, means for effecting horizontal adjustment of the ears relative to each other, depending contact points carried by the bars arranged to engage the contact finger carried by the compass-card, a mercury-pot in axial alinement with the pivot-post into which one end of the contact finger is fitted, means in connection with the block for supporting the mercury-pot, a conductor connecting each ear and an individual ring of the series carried by the block hub, and a conductor connecting one of the rings and mercury-pot.

3. An automatic steering apparatus comprising a compass-card, a finger carried thereby, a rotatory adjustable head in axial alinement with the compass-card and above the same, a mercury containing pot carried by the head in axial alinement with the compass-card, a downturned terminal end extending from the contact finger into the pot, plates pivoted to the head, means for adjusting the plates about their pivot points, ears extending from the plates, rack-bars in slidable engagement with the ears, adjusting pinions in mesh with the rack-bars, arms extending from the rack-bars, a plurality of contact wires loosely suspended from the arms adapted to engage the free end of the contact finger, a conductor wire in circuit with each rack-bar, and a conductor wire in circuit with the mercury-pot.

4. An automatic steering apparatus comprising a compass-card, a contact finger carried thereby, a rotary adjustable head in axial alinement with the compass-card and above the same, a mercury-containing pot carried by the head in axial alinement with said compass-card, a downturned end extending from the contact-finger into the pot, arms carried by the head, contact members in connection with the arms for engagement with the contact-finger, means for adjusting the arms in or out with respect to the head axis, and means for spreading or contracting the arms with relation to each other.

In testimony that we claim the foregoing we have hereunto set our hands at Milwaukee in the county of Milwaukee and State of Wisconsin in the presence of two witnesses.

AUGUST T. NELSON.
CHARLES A. KLAWITER.

Witnesses:
MAY DOWNEY,
GEO. W. YOUNG.